(12) United States Patent
Yamaguchi et al.

(10) Patent No.: US 9,282,275 B2
(45) Date of Patent: Mar. 8, 2016

(54) TELEVISION AND ELECTRONIC APPARATUS

(71) Applicant: KABUSHIKI KAISHA TOSHIBA, Tokyo (JP)

(72) Inventors: Akifumi Yamaguchi, Kawasaki (JP); Tomohiro Hamada, Tachikawa (JP); Seiji Hashimoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/458,775

(22) Filed: Aug. 13, 2014

(65) Prior Publication Data

US 2014/0347569 A1  Nov. 27, 2014

Related U.S. Application Data

(62) Division of application No. 13/175,496, filed on Jul. 1, 2011, now abandoned.

(30) Foreign Application Priority Data

Nov. 5, 2010  (JP) .................................. 2010-249146

(51) Int. Cl.
| | |
|---|---|
| *H04N 5/645* | (2006.01) |
| *G06F 1/20* | (2006.01) |
| *H04N 5/64* | (2006.01) |

(52) U.S. Cl.
CPC .................. *H04N 5/645* (2013.01); *G06F 1/20* (2013.01); *G06F 1/203* (2013.01); *H04N 5/64* (2013.01)

(58) Field of Classification Search
CPC ....... G06F 1/20; H01L 23/427; H01L 23/467; H04N 5/64
See application file for complete search history.

(56) References Cited

U.S. PATENT DOCUMENTS

| | | | | |
|---|---|---|---|---|
| 6,166,906 | A * | 12/2000 | Sun et al. ...................... | 361/697 |
| 6,771,497 | B2 * | 8/2004 | Chen et al. ............... | 361/679.47 |
| 6,781,835 | B2 * | 8/2004 | Hashimoto et al. ........... | 361/697 |
| 6,867,971 | B2 * | 3/2005 | Lai ................ | 361/697 |
| 7,079,394 | B2 * | 7/2006 | Mok ............. | 361/700 |
| 7,248,473 | B2 | 7/2007 | Ohnishi et al. | |
| 7,262,965 | B2 * | 8/2007 | Cheng ........................ | 361/697 |
| 7,380,585 | B2 * | 6/2008 | Liu et al. .................. | 165/104.33 |
| 2003/0005584 | A1 | 1/2003 | Komatsu et al. | |
| 2003/0161102 | A1 * | 8/2003 | Lee et al. ..................... | 361/687 |

(Continued)

FOREIGN PATENT DOCUMENTS

| | | |
|---|---|---|
| JP | 2000-154981 A | 6/2000 |
| JP | 2003-097892 | 4/2003 |
| JP | 2005-268327 | 9/2005 |

OTHER PUBLICATIONS

First Office Action mailed by Japan Patent Office on Jan. 31, 2012 in the corresponding Japanese patent application No. 2010-249146.

(Continued)

*Primary Examiner* — Jay Patel
*Assistant Examiner* — Neil Mikeska
(74) *Attorney, Agent, or Firm* — Knobbe, Martens, Olson & Bear, LLP

(57) ABSTRACT

According to one embodiment, an electronic apparatus includes a housing, a heat sink in the housing, a heat pipe including a curved portion toward the heat sink, and a fan including a cutout portion accommodating the curved portion.

7 Claims, 9 Drawing Sheets

(56) References Cited

U.S. PATENT DOCUMENTS

| | | |
|---|---|---|
| 2004/0001316 A1 | 1/2004 | Kamikawa et al. |
| 2004/0099404 A1* | 5/2004 | Cipolla et al. ............... 165/80.3 |
| 2005/0207124 A1 | 9/2005 | Ohnishi et al. |
| 2006/0137861 A1* | 6/2006 | Wang et al. ............... 165/104.33 |
| 2007/0121291 A1* | 5/2007 | Wang et al. .................... 361/695 |
| 2008/0030955 A1 | 2/2008 | Chen et al. |
| 2008/0043436 A1* | 2/2008 | Hung et al. ................... 361/700 |
| 2008/0093056 A1* | 4/2008 | Hwang et al. ............ 165/104.33 |
| 2008/0101017 A1* | 5/2008 | Hata et al. ..................... 361/690 |
| 2009/0244843 A1* | 10/2009 | Hirohata et al. .............. 361/696 |
| 2010/0307719 A1* | 12/2010 | Yang et al. ............... 165/104.26 |
| 2011/0042043 A1 | 2/2011 | Chen |

OTHER PUBLICATIONS

First Office Action mailed by Japan Patent Office on Aug. 7, 2012 in the corresponding Japanese patent application No. 2012-114167.

* cited by examiner

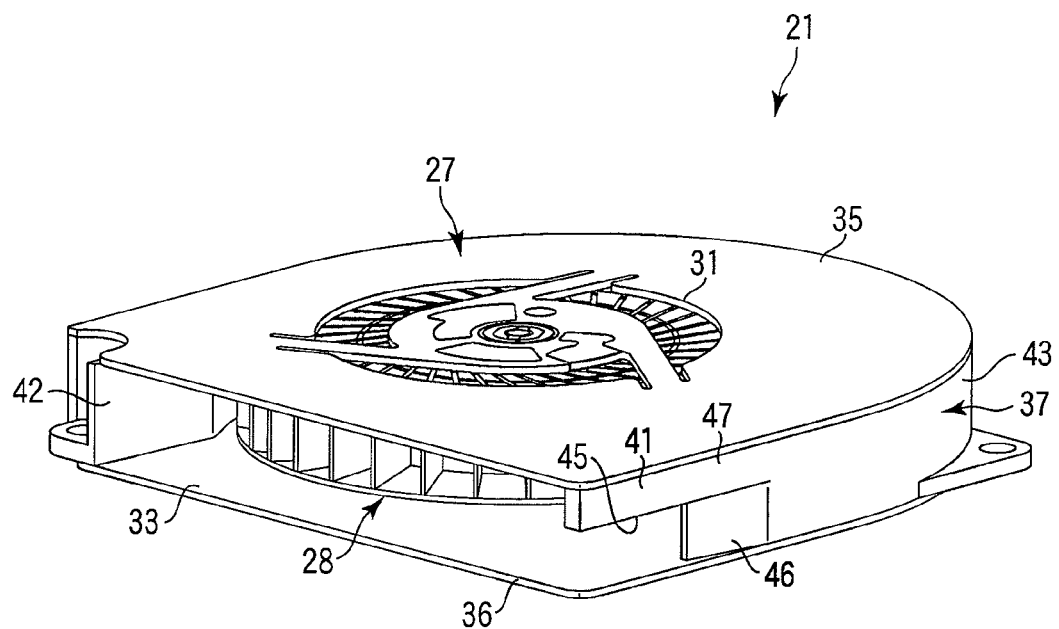
F I G. 3
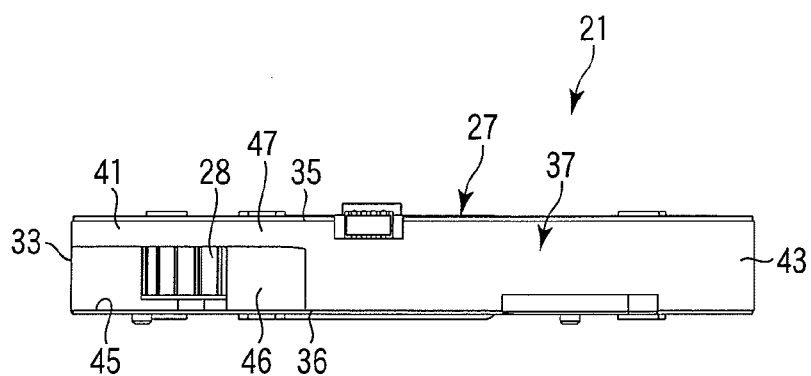
F I G. 4

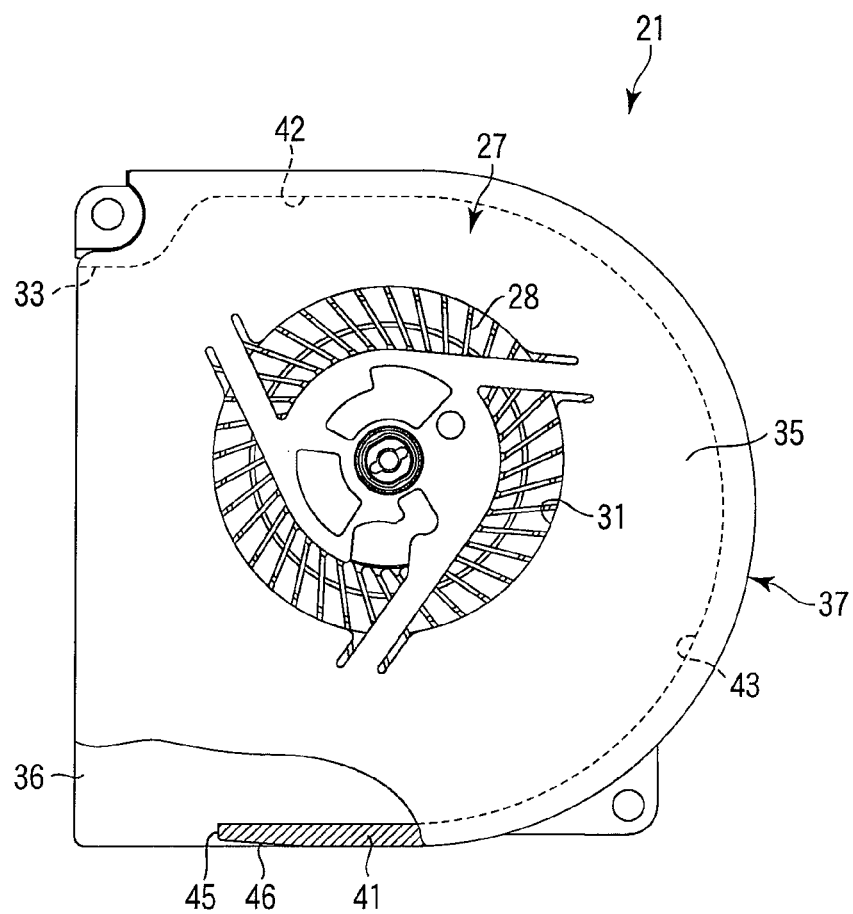
F I G. 5

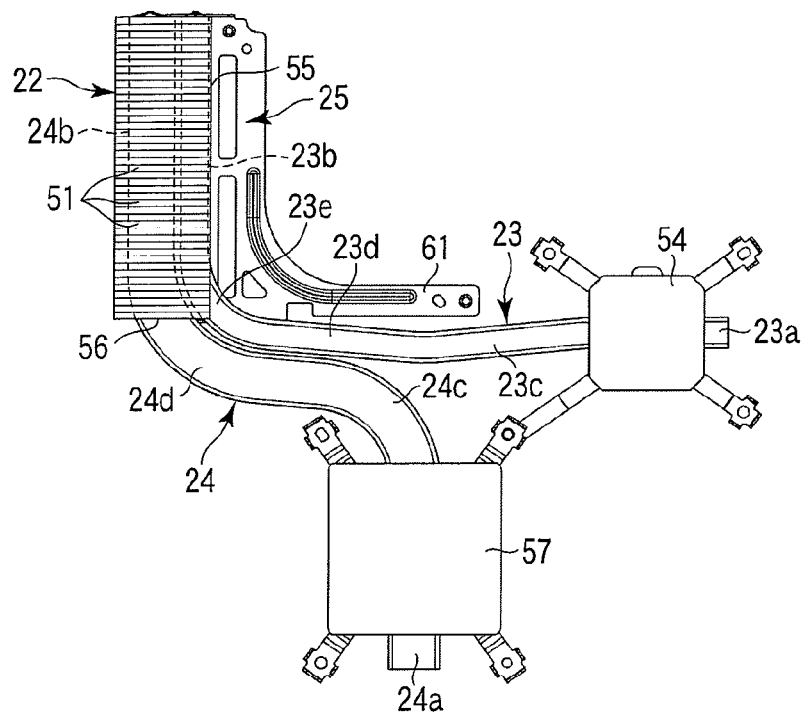
F I G. 6
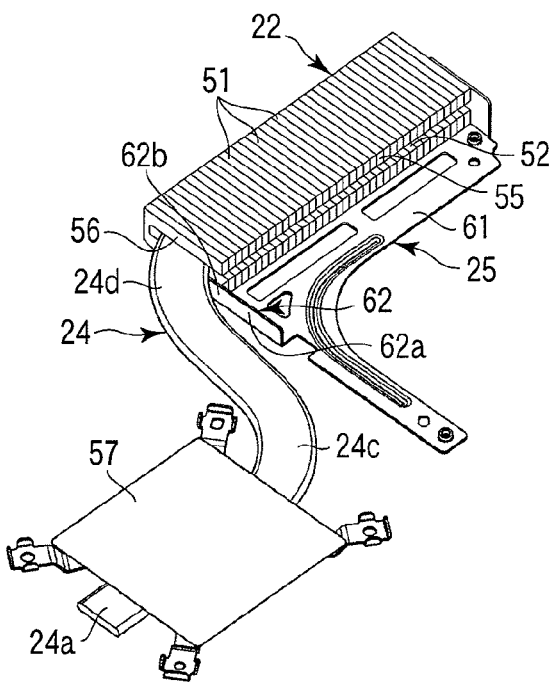
F I G. 7

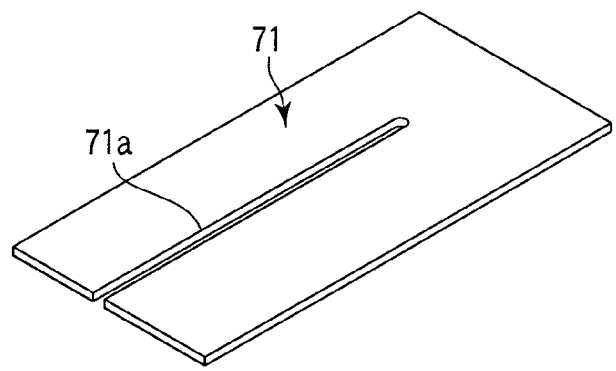
F I G. 11
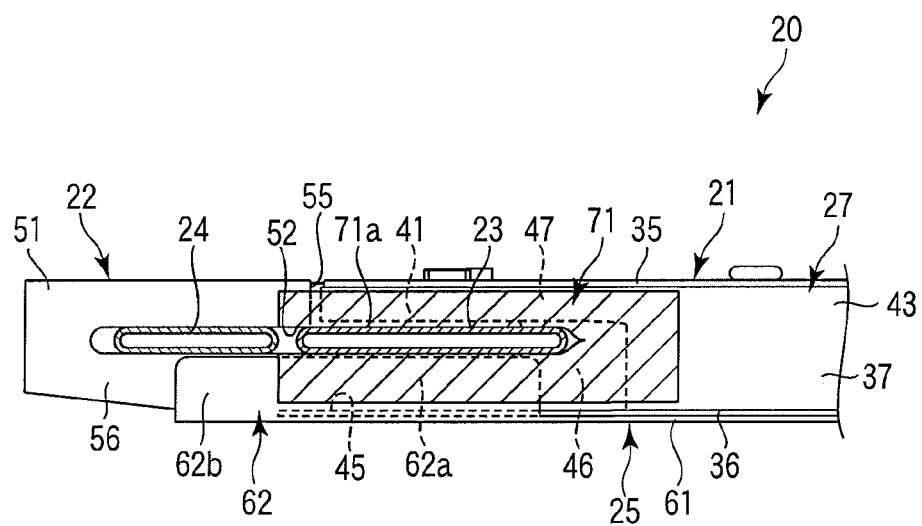
F I G. 12

TELEVISION AND ELECTRONIC APPARATUS

CROSS-REFERENCE TO RELATED APPLICATIONS

This application is a division of U.S. application Ser. No. 13/175,496, filed on Jul. 1, 2011 and titled "TELEVISION AND ELECTRONIC APPARATUS," which is incorporated in its entirety herein by reference and which is based upon and claims the benefit of priority from Japanese Patent Application No. 2010-249146, filed Nov. 5, 2010; the entire contents of which are incorporated herein by reference.

FIELD

Embodiments described herein relate generally to a television including a cooling module, and an electronic apparatus including a cooling module.

BACKGROUND

There are many televisions and electronic apparatuses that include a cooling module.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary perspective view of a fan shown in FIG. 2;

FIG. 4 is an exemplary side view of the fan shown in FIG. 2;

FIG. 5 is an exemplary plan view of the fan shown in FIG. 2;

FIG. 6 is an exemplary plan view of heat pipes and a heat sink shown in FIG. 2;

FIG. 7 is an exemplary perspective view which shows the heat sink, a second heat pipe, and a bracket, and in which a first heat pipe is removed from the structure shown in the FIG. 6;

FIG. 11 is an exemplary perspective view of a cover according to a second embodiment;

FIG. 12 is an exemplary side view of a cooling module of the second embodiment.

DETAILED DESCRIPTION

Figure 1:
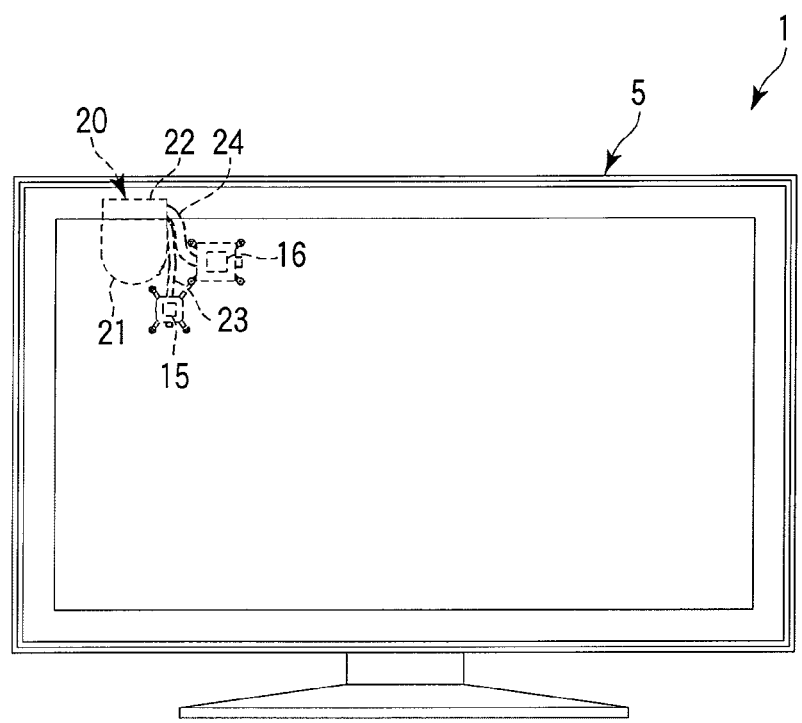
FIG. 1 is an exemplary front view of a television according to a first embodiment.

Various embodiments will be described hereinafter with reference to the accompanying drawings.

In general, according to one embodiment, an electronic apparatus comprises a housing, a heat sink in the housing, a heat pipe comprising a curved portion toward the heat sink, and a fan comprising a cutout portion accommodating the curved portion.

Embodiments will be described below with reference to the drawings.

(First Embodiment)

FIGS. 1 to 10 show a television 1 according to a first embodiment. The television 1 includes a housing 5. The housing 5 accommodates a circuit board 14 shown in FIG. 2. The circuit board 14 is, for example, a main circuit board. The circuit board 14 has a first surface 14a and a second surface (not shown) on the opposite side of the first surface 14a.

First and second heat generating components 15 and 16 are mounted on, for example, the second surface of the circuit board 14. An example of the first heat generating component 15 is a graphic chip. An example of the second heat generating component 16 is a central processing unit (CPU). The amount of heat generated by the second heat generating component 16 is larger than that generated by the first heat generating component 15. Meanwhile, the first and second heat generating components 15 and 16 are not limited to the above-mentioned examples, and appropriately correspond to various electronic components expected to radiate heat.

Figure 2:
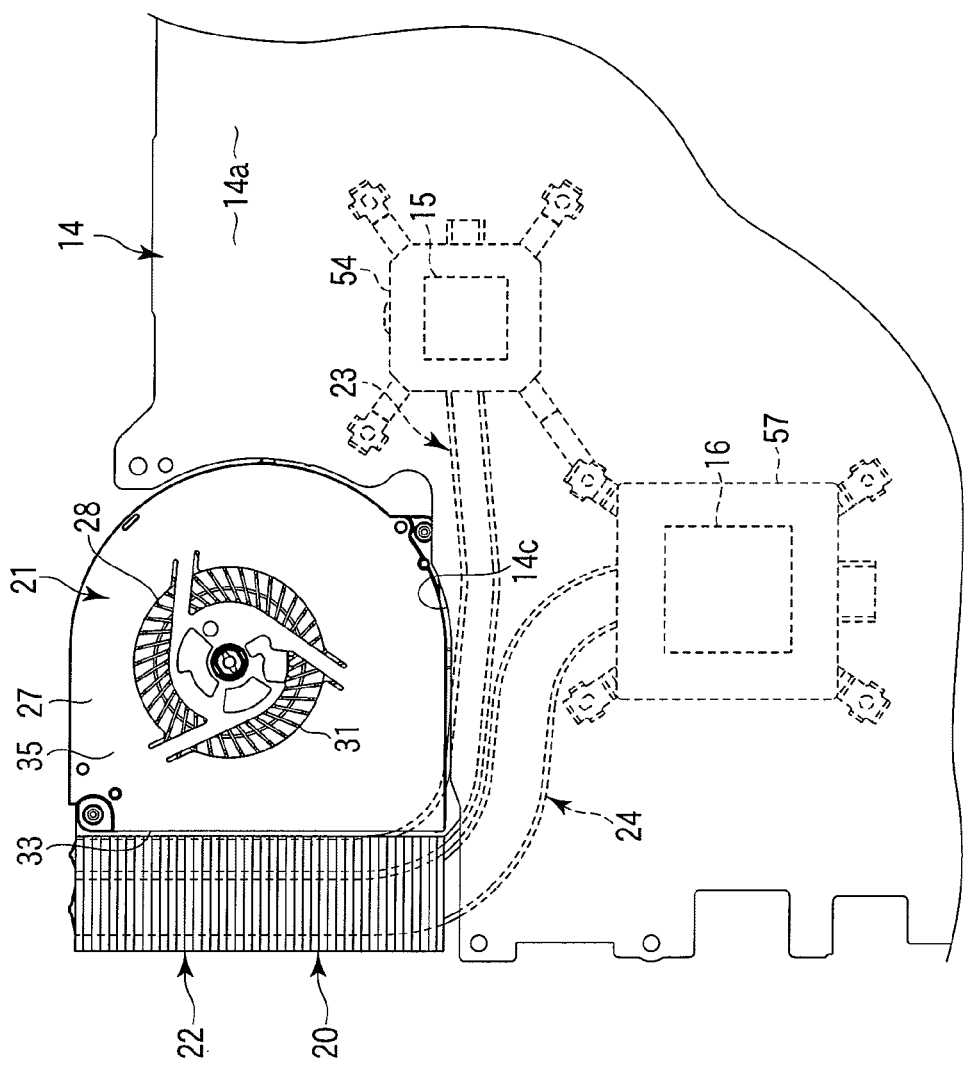
FIG. 2 is an exemplary plan view showing a circuit board and a cooling module of the first embodiment.

As shown in FIG. 2, the television 1 is provided with a cooling module 20. The cooling module 20 includes a fan 21, a heat sink 22, first and second heat pipes 23 and 24, and a bracket 25. The bracket 25 is an example of a "holder."

The circuit board 14 includes a cutout portion 14c that is to avoid the fan 21 and the heat sink 22. The cutout portion 14c is formed so as to substantially correspond to the outward appearance of the fan 21 and the heat sink 22. The fan 21 and the heat sink 22 are in the cutout portion 14c of the circuit board 14, and are arranged with the circuit board 14. The end surfaces of the fan 21 and the heat sink 22 are substantially flush with, for example, the first surface 14a of the circuit board 14.

As shown in FIGS. 3 to 5, the fan 21 includes a fan case 27 and an impeller 28 that rotates in the fan case 27. The fan case 27 includes suction ports 31 and a discharge port 33. Air in the housing 5 is supplied into the fan case 27 through the suction ports 31. The discharge port 33 faces the heat sink 22. Air is discharged to the heat sink 22 from the discharge port 33.

The structure of the fan 21 will be described below. The fan case 27 includes a first flat plate portion 35, a second flat plate portion 36, and a peripheral wall portion 37. The first and second flat plate portions 35 and 36 are formed of metal plates, respectively, and have the same shape. The first and second flat plate portions 35 and 36 are divided above and below the impeller 28, and face the impeller 28 in the axial direction of the impeller 28, that is, in the axial direction of a rotating shaft of the impeller 28. Meanwhile, in this specification, upper and lower sides of the cooling module 20 are defined on the basis of a horizontal posture of the fan 21.

The first flat plate portion 35 is above the impeller 28, and forms a top plate of the fan case 27. The second flat plate portion 36 is below the impeller 28, and forms a bottom plate of the fan case 27. The suction ports 31 are formed at the first and second flat plate portions 35 and 36, respectively. As described below, the second flat plate portion 36 faces the bracket 25.

The peripheral wall portion 37 is a wall portion standing between the first and second flat plate portions 35 and 36, and is attached to the first and second flat plate portions 35 and 36 by, for example, welding or the like. The peripheral wall portion 37 is made of a synthetic resin. The peripheral wall portion 37 is formed along the periphery of the impeller 28. The peripheral wall portion 37 surrounds the impeller 28 in a U shape in the radial direction of the impeller 28, that is, in the radial direction of the rotating shaft of the impeller 28. That is, the peripheral wall portion 37 surrounds the impeller 28 in three directions except for the direction where the discharge port 33 is opened.

In detail, the peripheral wall portion 37 includes a first side wall portion 41 (first wall portion), a second side wall portion 42 (second wall portion), and a curved wall portion 43 (third wall portion). The first and second side wall portions 41 and 42 are divided on both sides of the discharge port 33. The first and second side wall portions 41 and 42 extend substantially linearly toward the discharge port 33 from the sides of the impeller 28, respectively.

The first and second side wall portions 41 and 42 are adjacent to the discharge port 33. That is, the first and second side wall portions 41 and 42 define the discharge port 33 in cooperation with the first and second flat plate portions 35 and 36. The curved wall portion 43 is on the side opposite to the discharge port 33, and connects the end portion of the first side wall portion 41 to the end portion of the second side wall portion 42 in a circular arc shape.

The first side wall portion 41 is more distant from the rotation center of the impeller 28 than the second side wall portion 42 is. That is, a gap between the first side wall portion 41 and the impeller 28 is larger than a gap between the second side wall portion 42 and the impeller 28.

As shown in FIGS. 3, 4, and 5, a cutout portion 45 is formed at the fan case 27 of this embodiment. The cutout portion 45 is formed at the end portion (tip portion) of the first side wall portion 41 so as to be adjacent to the discharge port 33. That is, the cutout portion 45 is connected to the discharge port 33. The cutout portion 45 is larger than the thickness of the first heat pipe 23. The cutout portion 45 and the discharge port 33, in this order, are arranged in the rotational direction of the impeller 28.

The end portion (lower end portion) of the first side wall portion 41 facing the second flat plate portion 36 is cut out, so that the cutout portion 45 is formed between the first side wall portion 41 and the second flat plate portion 36. That is, the cutout portion 45 is defined between the second flat plate portion 36 and the L-shaped end portion of the first side wall portion 41.

As shown in FIGS. 3, 4, and 5, a recessed portion 46 (e.g., slope) is formed at the first side wall portion 41. The cutout portion 45 is located between the recessed portion 46 and the discharge port 33. The first side wall portion 41 includes a flat portion 47 away from the recessed portion 46. The recessed portion 46 is recessed from the flat portion 47 toward the inside of the fan case 27.

That is, there is a difference in the level between the surface of the flat portion 47 and the surface of the recessed portion 46. The surface of the recessed portion 46 is inclined so as to be recessed more greatly toward the inside of the fan case 27 as approaching the cutout portion 45. Meanwhile, the inner surface of the recessed portion 46, that is, the surface of the recessed portion exposed to the inside of the fan case 27 is continuously connected to the inner surface of the flat portion 47, and there is no difference in the level between the inner surface of the recessed portion and the inner surface of the flat portion. The first heat pipe 23 extends along the recessed portion 46. That is, the recessed portion 46 faces the first heat pipe 23.

As shown in FIGS. 6 and 7, the heat sink 22 is a fin unit where a plurality of fins 51 is arranged. The width of the heat sink 22 is substantially equal to that of the fan 21. That is, the heat sink 22 is larger than the discharge port 33 of the fan 21 and covers substantially the entire discharge port 33. The heat sink 22 is disposed so that little or no gap is left between the discharge port 33 of the fan 21 and the heat sink.

Each of the fins 51 is formed in a U shape. Since the plurality of fins 51 is arranged, a recessed portion 52 facing the discharge port 33 of the fan 21 is formed at the heat sink 22. The recessed portion 52 is formed over substantially the entire length of the heat sink 22, and is opened toward the discharge port 33. The depth of the recessed portion 52 in the direction from the fan 21 to the heat sink 22 is larger than the sum of the widths of the first and second heat pipes 23 and 24. The first and second heat pipes 23 and 24 are accommodated in the recessed portion 52.

Figure 8:
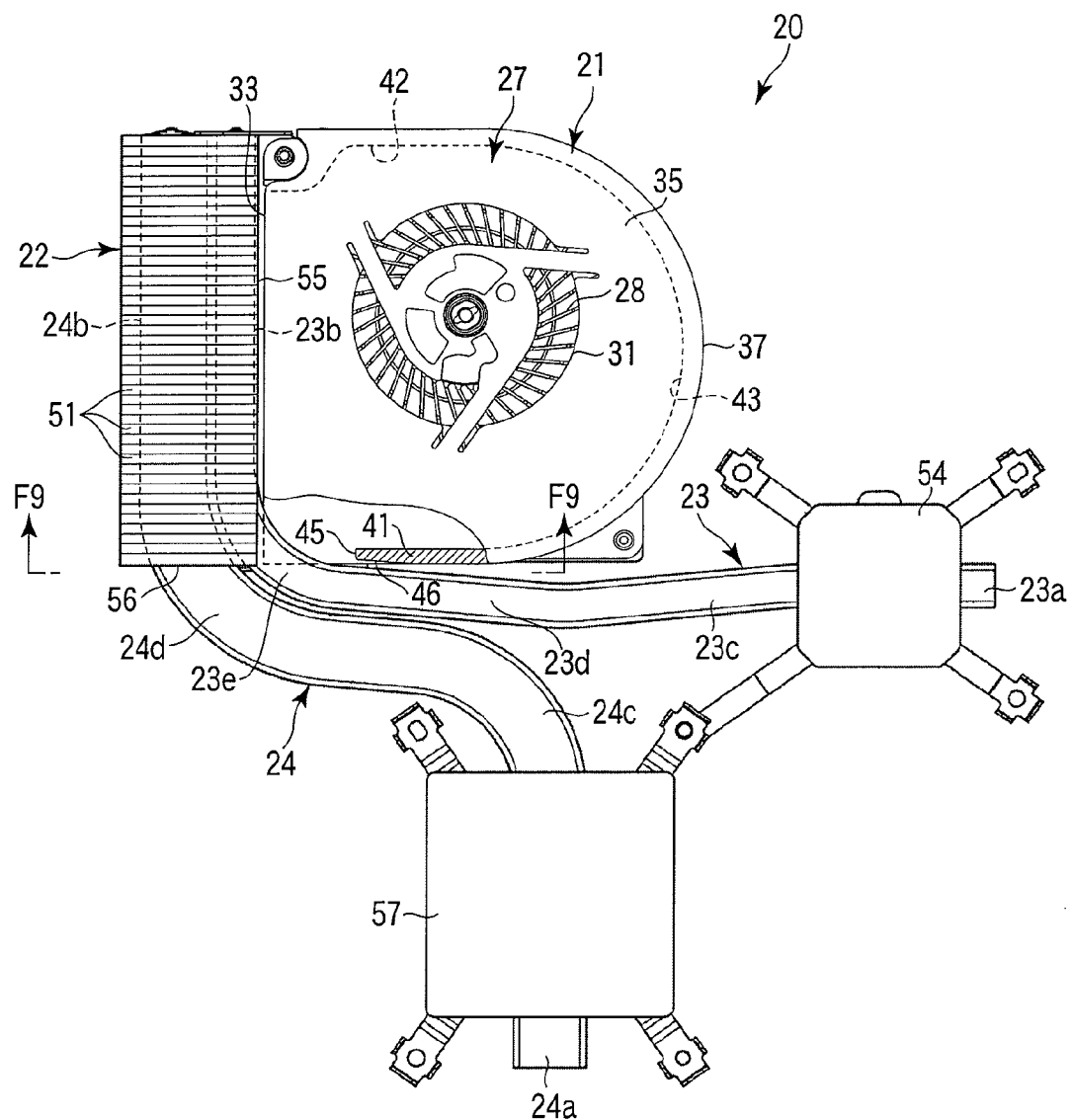
FIG. 8 is an exemplary plan view of the cooling module shown in FIG. 2.

As shown in FIG. 8, the first and second heat pipes 23 and 24 are substantially parallel to each other. Each of the first and second heat pipes 23 and 24 is crushed in the thickness direction of the fan 21 and has a flat cross-section.

The first heat pipe 23 is between the first heat generating component 15 and the heat sink 22. The first heat pipe 23 extends so as to pass through the gap between the fan 21 and the second heat generating component 16. In detail, the first heat pipe 23 includes a heat receiving portion 23a, a heat radiating portion 23b, a first linear portion 23c, a second linear portion 23d, and a curved portion 23e. The heat receiving portion 23a faces the first heat generating component 15, and is thermally connected to the first heat generating component 15 by, for example, a heat receiving plate 54 or the like. The heat receiving portion 23a is configured to receive heat from the first heat generating component 15.

The heat radiating portion 23b is accommodated in the recessed portion 52 of the heat sink 22, and is fixed to the heat sink 22. The heat radiating portion 23b is thermally connected to the heat sink 22, and is configured to radiate heat from the first heat generating component 15 to the heat sink 22. The surface of the heat radiating portion 23b facing the fan 21 is substantially flush with the surface of the heat sink 22 facing the fan 21. The surface of the heat sink is a main surface portion 55 to be described below.

The first and second linear portions 23c and 23d extend along the fan 21. In detail, the first linear portion 23c is adjacent to the heat receiving portion 23a and extends from the heat receiving portion 23a toward the side of the fan 21. The first linear portion 23c extends while slightly inclined with respect to the fan 21 so as to be away from the fan 21 as approaching the heat sink 22.

The second linear portion 23d is connected to the first linear portion 23c, and extends from the first linear portion 23c to the side of the recessed portion 46 of the first side wall portion 41. The second linear portion 23d is slightly bent from the first linear portion 23c, and extends while slightly inclined with respect to the fan 21 so as to approach the fan 21 as approaching the heat sink 22.

As shown in FIG. 8, the curved portion 23e is at a part of the portion between the heat receiving portion 23a and the heat radiating portion 23b, for example. The curved portion 23e is between the second linear portion 23d and the heat radiating portion 23b. The curved portion 23e is bent from the side of the fan 21 toward the heat sink 22 in a circular arc shape. The curved portion 23e is inserted into the cutout portion 45 of the fan case 27 in the bending direction thereof, that is, toward the inside of the circular arc.

Accordingly, as shown in FIG. 8, at least a part of the curved portion 23e of the heat pipe 23 extends in the fan case 27. At least a part of the heat pipe 23 is inserted into the recessed portion 52 of the heat sink 22 and connected to the heat sink 22 at a position closer than the first side wall portion 41 to the center portion of the heat sink 22.

That is, the heat sink 22 includes a main surface portion 55 that faces the discharge port 33 of the fan 21 and an end portion 56 that is the end portion of the heat sink 22 in the longitudinal direction of the heat sink. At least a part of the first heat pipe 23 is not inserted into the heat sink 22 from the end portion 56 but is inserted into the heat sink 22 from the main surface portion 55.

The second heat pipe 24 is on the side of the first heat pipe 23 opposite to the fan 21. The second heat pipe 24 is between the second heat generating component 16 and the heat sink 22. In detail, the second heat pipe 24 includes a heat receiving portion 24a, a heat radiating portion 24b, a first curved portion 24c, and a second curved portion 24d. The heat receiving portion 24a faces the second heat generating component 16, and is thermally connected to the second heat generating component 16 by, for example, a heat receiving plate 57 or the like. The heat receiving portion 24a is configured to receive heat from the second heat generating component 16.

The heat radiating portion 24b is accommodated in the recessed portion 52 of the heat sink 22, and is fixed to the heat sink 22. The heat radiating portion 24b is thermally connected to the heat sink 22, and is configured to radiate heat from the second heat generating component 16 to the heat sink 22.

The first curved portion 24c is adjacent to the heat receiving portion 24a and is bent in a circular arc shape in a direction to avoid the fan 21. The second curved portion 24d is between the first curved portion 24c and the heat radiating portion 24b, and is bent substantially parallel to the curved portion 23e of the first heat pipe 23. That is, the second curved portion 24d is bent in a circular arc shape toward the heat sink 22.

The second heat pipe 24 has a larger diameter than the first heat pipe 23, and has a higher heat transport capacity than the first heat pipe. For this reason, the second heat pipe 24 cannot be bent at a small radius of curvature like the first heat pipe 23, and is bent with a radius of curvature larger than that of the first heat pipe 23.

In other words, the two heat pipes 23 and 24 are in parallel. The first heat pipe 23 is between the second heat pipe 24 and the fan 21, and is bent with a radius of curvature smaller than that of the second heat pipe 24. That is, the heat pipe 23 corresponding to the inside (i.e., fan side) is bent with a radius of curvature smaller than that of the heat pipe 24 corresponding to the outside.

As shown in FIGS. 6, 7, and 8, the bracket 25 is fixed to the heat sink 22. The fan 21 is mounted on the bracket by, for example, screwing or the like. The bracket 25 integrally holds the heat sink 22 and the fan 21. The bracket 25 is made of metal. The bracket 25 includes a mounting portion 61 and a cover portion 62. The mounting portion 61 is in the shape of a flat plate so as to be substantially parallel to the second flat plate portion 36 of the fan 21. The mounting portion 61 extends from the lower side of the bracket 25 to the lower side of the fan 21, and the fan 21 is mounted on the mounting portion 61.

FIG. 7 shows the heat sink 22, the second heat pipe 24, and the bracket 25 when the first heat pipe 23 is removed, for convenience of the description. As shown in FIG. 7, the cover portion 62 is at the side end portion of the mounting portion 61. The cover portion 62 stands from the mounting portion 61.

Figure 9:
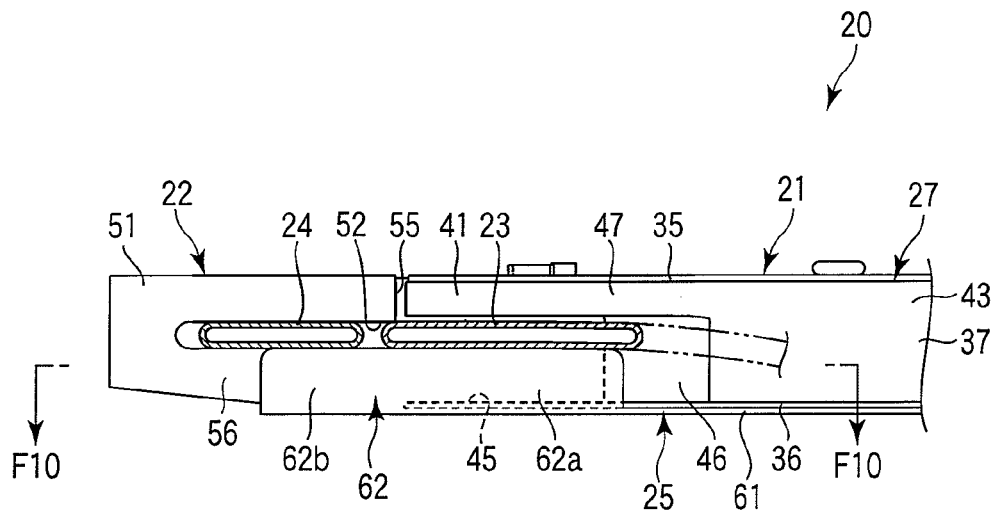
FIG. 9 is an exemplary cross-sectional view of the cooling module shown in FIG. 8 taken along a line F9-F9.
Figure 10:
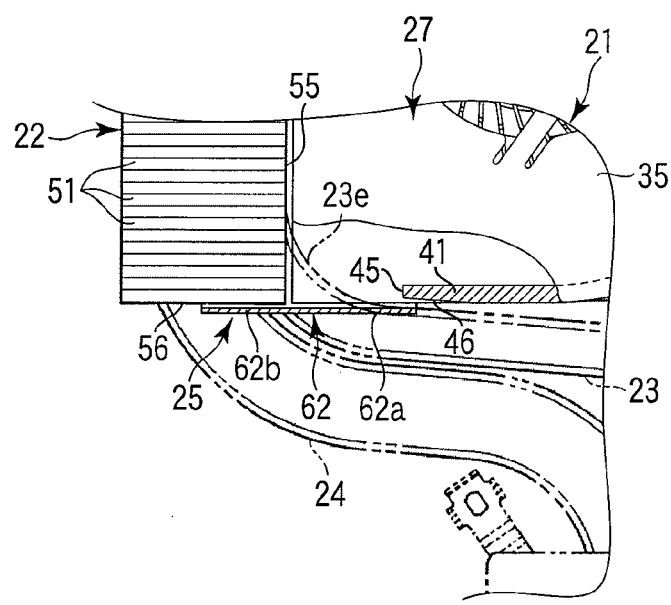
FIG. 10 is an exemplary cross-sectional view of the cooling module shown in FIG. 9 taken along a line F10-F10.

As shown in FIGS. 9 and 10, the cover portion 62 stands beside the fan 21 and extends from the side of the heat sink 22 to the side of the fan 21. The cover portion 62 includes a first portion 62a that faces the first side wall portion 41 of the fan 21 and a second portion 62b that faces the end portion 56 of the heat sink 22.

As shown in FIG. 9, the cover portion 62 comes into contact with the first and second heat pipes 23 and 24 from below. The first portion 62a of the cover portion 62 is below the first heat pipe 23 and supports the first heat pipe 23. The second portion 62b of the cover portion 62 is below the second heat pipe 24 and supports the second heat pipe 24.

As shown in FIGS. 9 and 10, the cover portion 62 covers at least a part of the cutout portion 45 from the outside of the fan 21. In detail, the first portion 62a of the cover portion 62 covers a gap between the first heat pipe 23 and the second flat plate portion 36. In other words, the end portion of the first side wall portion 41, which is any one of the end portion (upper end portion) of the first side wall portion 41 facing the first flat plate portion 35 and the end portion (lower end portion) of the first side wall portion facing the second flat plate portion 36 and covered with the cover portion 62, comprises the cutout portion 45.

As shown in FIGS. 9 and 10, the end portion of the cover portion 62 extends over the cutout portion 45 and faces the recessed portion 46 of the first side wall portion 41. That is, the cutout portion 45 is covered with the cover portion 62 beyond the entire length of the cutout portion in a direction from the fan 21 to the heat sink 22.

According to this structure, it may be possible to achieve high density mounting. That is, the minimum radius of curvature of a heat pipe is generally determined depending on the diameter of the heat pipe. For this reason, even though the heat pipe is bent from a portion of the heat pipe extending in the outside of the heat sink, a gap is necessarily left between the heat pipe and the fan. This gap hinders high density mounting.

Meanwhile, the cutout portion 45 into which the curved portion 23e of the heat pipe 23 is inserted is formed at the fan 21 in this embodiment. Accordingly, it may be possible to bend the heat pipe 23 from the portion of the heat pipe that overlaps the fan 21. Therefore, it may be possible to reduce the gap between the heat pipe 23 and the fan 21. That is, it may be possible to dispose the heat pipe 23 at a position closer to the fan 21, to reduce the size of the cooling module 20, and to achieve high density mounting.

In this embodiment, the bracket 25, which is attached to the heat sink 22 and holds the fan 21, includes the cover portion 62 that covers at least a part of the cutout portion 45 of the fan case 27. Accordingly, the leakage of air from the cutout portion 45 is suppressed. That is, the decrease in cooling efficiency, which is caused by the cutout portion 45, is suppressed by the bracket 25 that holds the fan 21.

In this embodiment, the fan case 27 includes the recessed portion 46 at the first side wall portion 41. If the recessed portion 46 is not formed, a large cutout portion 45 needs to be formed in consideration of component tolerance or the like in order to avoid the contact between the heat pipe 23 and the fan 21. However, since the recessed portion 46 of this embodiment is formed, it may be possible to more reduce the size of the cutout portion 45 while reducing a possibility that the heat pipe 23 and the fan 21 come into contact with each other. If the size of the cutout portion 45 can be reduced, the leakage of air is reduced. As a result, it may be possible to improve cooling efficiency.

Further, if the surface of the recessed portion 46 is inclined so as to be recessed more greatly toward the inside of the fan case 27 as approaching the cutout portion 45, it may be possible to further reduce the size of the cutout portion 45 while reducing the possibility that the heat pipe 23 and the fan 21 come into contact with each other.

In this embodiment, the fan case 27 includes the flat plate portion 36 and the peripheral wall portion 37 attached to the flat plate portion 36. The end portion of the peripheral wall portion 37 facing the flat plate portion 36 is cut out, so that the cutout portion 45 is formed between the peripheral wall portion 37 and the flat plate portion 36. According to this structure, it is easy to secure the stiffness of the peripheral wall portion 37 of the fan case 27 and to further easily form the peripheral wall portion as compared to the case where the cutout portion 45 is formed in the middle of the peripheral wall portion 37.

In this embodiment, the cutout portion 45 and the discharge port 33 are arranged in the rotational direction of the impeller 28 in this order. According to this, since it may be possible to blow a large amount of air toward the heat pipe 23 inserted into the cutout portion 45, cooling efficiency is improved. Further, in order to discharge a larger amount of air, a space between the first side wall portion 41 and the impeller 28 is larger than a space between the second side wall portion 42 and the impeller 28. That is, it is relatively easy to secure a space, through which the heat pipe 23 passes, near the first side wall portion 41 in the fan case 27.

In this embodiment, the recessed portion 52, which faces the discharge port 33 of the fan 21 and into which the heat pipe 23 is inserted, is formed at the heat sink 22. According to this, it is easy to connect the heat pipe 23, which extends in the fan case 27, to the heat sink 22 at the position closer to the center portion of the heat sink 22 than the first side wall portion 41.

In this embodiment, the cover portion 62 includes a portion (first portion 62a) facing the first side wall portion 41 of the fan 21, and the portion comes into contact with the heat pipe 23 and supports the heat pipe 23. According to this, the heat pipe 23 is supported by the bracket 25 not only at the side of the heat sink 22 but also at the side of the fan 21. Accordingly, the stiffness of the entire cooling module 20 is improved.

In this embodiment, the first heat pipe 23 is between the second heat pipe 24 and the fan 21 and is bent with a radius of curvature smaller than that of the heat pipe 24. According to this, it may be possible to put the plurality of heat pipes 23 and 24 in a smaller mounting area.

(Second Embodiment)

Next, a television 1 according to a second embodiment will be described with reference to FIGS. 11 and 12. Meanwhile, structures having the functions, which are the same as or similar to the functions of the structures of the first embodiment, are denoted by the same reference numerals and the description thereof will be omitted. Further, other structures than the structures to be described below are the same as those of the first embodiment.

FIG. 11 shows a cover 71 of this embodiment. The cover 71 is formed of, for example, sponge, rubber, a film member, or the like, and has elasticity or flexibility. A slit 71a is formed, for example, in the center portion of the cover 71.

FIG. 12 shows the mounting structure of the cover 71 on a cooling module 20. Meanwhile, for convenience of the description, the cover 71 is hatched in FIG. 12. The first heat pipe 23 is inserted into the slit 71a as shown in FIG. 12, so that the cover 71 is attached to the fan 21 or the bracket 25. That is, the slit 71a is opened so as to follow the outer shape of the first heat pipe 23, so that the cover 71 comes into close contact with the first heat pipe 23.

The cover 71 covers at least a part of the cutout portion 45. The cover 71 covers, for example, a gap between the first heat pipe 23 and the first side wall portion 41, which is formed at an upper portion of the first heat pipe 23, and a gap between the first heat pipe 23 and the recessed portion 46.

According to this structure, it may be possible to achieve high density mounting as in the first embodiment. Further, it may be possible to improve cooling efficiency in this embodiment. That is, a cutout portion 45, which is larger than the heat pipe 23, is formed in consideration of component tolerance or the like in order to avoid the contact between the heat pipe 23 and the fan 21. For this reason, there is a possibility that air leaks from the cutout portion 45. However, if the cover 71 of this embodiment is provided, the leakage of air from the cutout portion 45 is reduced. As a result, it may be possible to improve cooling efficiency.

(Third Embodiment)

Next, an electronic apparatus 81 according to a third embodiment will be described with reference to FIG. 13. Meanwhile, structures having the functions, which are the same as or similar to the functions of the structures of the first embodiment, are denoted by the same reference numerals and the description thereof will be omitted. Further, other structures than the structures to be described below are the same as those of the first embodiment.

Figure 13:
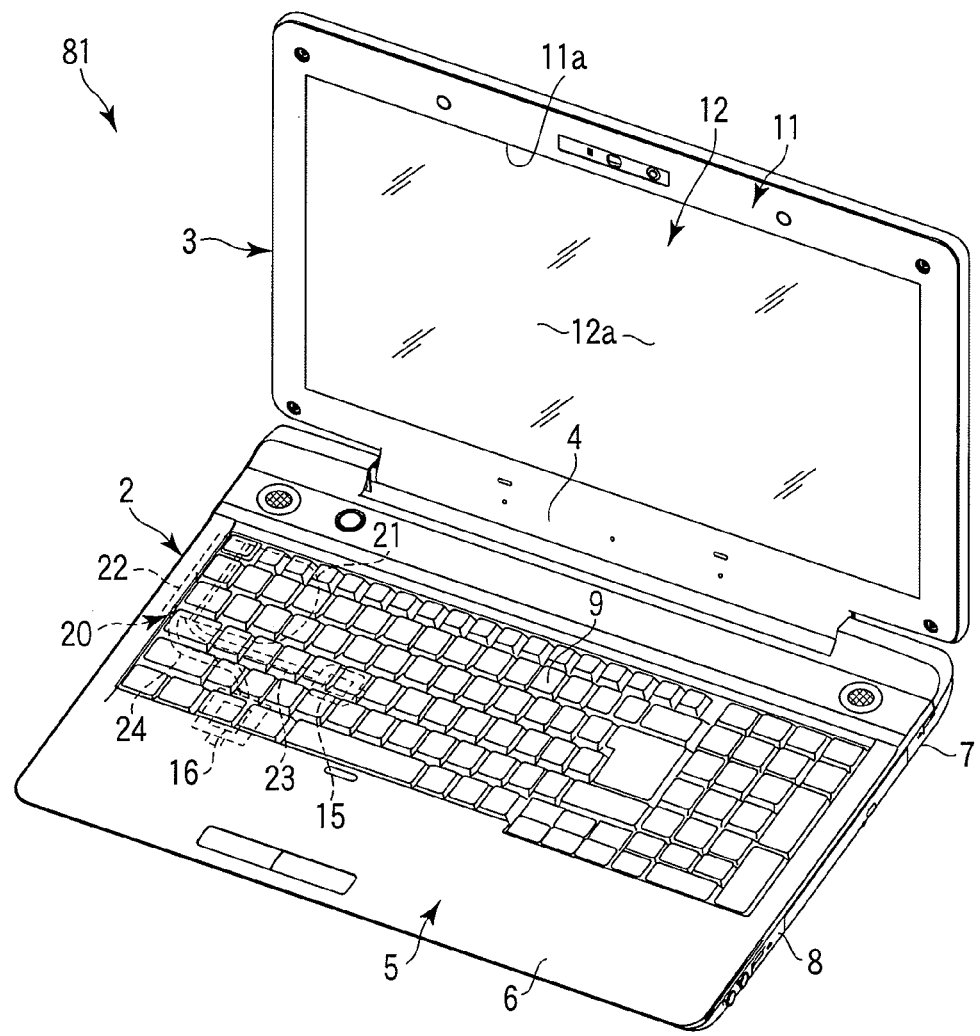
FIG. 13 is an exemplary perspective view of an electronic apparatus according to a third embodiment.

As shown in FIG. 13, the electronic apparatus 81 is, for example, a notebook type personal computer. Meanwhile, an electronic apparatus to which this embodiment may be applied is not limited to the above-mentioned apparatus. This embodiment may be widely applied to various electronic apparatuses that include, for example, a recording/reproducing apparatus, a PDA (Personal Digital Assistant), and a game console.

As shown in FIG. 13, the electronic apparatus 81 includes a main body unit 2, a display unit 3, and a hinge 4. The main body unit 2 is a main body of the electronic apparatus where a main board is mounted. The main body unit 2 includes a housing 5. The housing 5 includes an upper wall 6, a lower wall 7, and a peripheral wall 8, and is formed in the shape of a flat box.

When the electronic apparatus 81 is placed on a desk, the lower wall 7 faces the upper surface of the desk. The lower wall 7 is substantially parallel to the upper surface. The upper wall 6 extends so as to be substantially parallel to the lower wall 7 (that is, so as to be substantially horizontal) with a space therebetween. A keyboard 9 is mounted on the upper wall 6. The peripheral wall 8 stands from the lower wall 7, and connects the peripheral edge portion of the lower wall 7 to the peripheral edge portion of the upper wall 6.

The display unit 3 is pivotally (openably and closably) connected to the rear end portion of the main body unit 2 by the hinge 4. The display unit 3 can pivot between a closed position where the display unit falls so as to cover the main body unit 2 from above and an open position where the display unit is raised from the main body unit 2.

As shown in FIG. 13, the display unit 3 includes a display housing 11 and a display panel 12 in the display housing 11. A display screen 12a of the display panel 12 is exposed to the outside through an opening 11a formed at the front wall of the display housing 11.

The housing 5 of the main body unit 2 accommodates the circuit board 14 shown in FIG. 2. The circuit board 14 is, for example, a main circuit board. The circuit board 14 has a first surface 14a corresponding to, for example, an upper surface and a second surface (not shown) positioned on the side opposite to the first surface 14a and corresponding to, for example, a lower surface.

The housing 5 of the electronic apparatus 81 further accommodates a cooling module 20. The cooling module 20 is the same as the cooling module of the first embodiment. That is, the cooling module 20 includes a fan 21, a heat sink 22, first and second heat pipes 23 and 24, and a bracket 25. A fan case 27 of the fan 21 includes a cutout portion 45 into which a curved portion 23e of the first heat pipe 23 is inserted.

According to this structure, it may be possible to achieve high density mounting as in the first embodiment. Further, the cooling module 20 according to this embodiment may be provided with the same cover 71 as the cover of the second embodiment.

Meanwhile, the embodiments are not limited to the above-mentioned embodiments, and may be embodied with the modifications of components without departing from the scope of the invention when being embodied. Further, it may be possible to make various inventions by the appropriate combination of a plurality of components disclosed in the above-mentioned embodiments. For example, some components may be removed from all the components disclosed in the above-mentioned embodiments. Furthermore, components of different embodiments may be appropriately combined with each other.

For example, the heat pipe 23 does not necessarily need to be connected to the heat sink 22 at a position closer than the first side wall portion 41 to the center portion of the heat sink 22. If the cutout portion 45 is only formed at the fan case 27 and the heat pipe 23 is only inserted into the cutout portion 45, it may be possible to reduce the size of the cooling module 20 and to achieve high density mounting. The bracket 25 is not an indispensable component and may be omitted.

The recessed portion 46 may not be formed at the first side wall portion 41. The cutout portion 45 may not be formed at the end portion of the first side wall portion facing the flat plate portion 36 and may be formed at the center portion of the first side wall portion 41. The cutout portion 45 may be formed at the second side wall portion 42 instead of the first side wall portion 41. The cover portion 62 of the bracket 25 may not support the heat pipes 23 and 24. The second heat pipe 24 is not an indispensable component and may be omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a housing;
    a fan in the housing, the fan comprising a fan case which is a separate body from the housing, the fan case comprising a wall, a discharge port at an end of the wall, and a cutout portion provided in the wall and adjacent to the discharge port;
    a heat sink in the housing, the heat sink located outside the fan case and facing the discharge port;
    a heat pipe comprising a middle portion and one end portion, the middle portion passing through the cutout portion, the one end portion being disposed at the discharge port and connected to the heat sink; and
    a cover attached on the outside of the fan case and configured to cover a part of the cutout portion, the cover comprising a slit through which the middle portion is passing.

2. The electronic apparatus of claim 1, wherein the heat sink is larger than the discharge port.

3. The electronic apparatus of claim 1, wherein
    the heat sink comprises a plurality of fins arranged with each other, and
    the heat sink is larger than the discharge port in a direction in which the plurality of fins are arranged, and at least one of the plurality of fins is out of a downstream of the discharge port.

4. The electronic apparatus of claim 1, wherein
    the fan comprises an impeller,
    the fan case further comprises two flat plates interposing the impeller in an axial direction of the impeller, and the wall is a peripheral wall between the two flat plates, and
    the heat pipe is configured to be inserted into the cutout portion after the two flat plates and the peripheral wall of the fan case are composed.

5. The electronic apparatus of claim 1, wherein the slit is thinner than the heat pipe, and the heat pipe is inserted into the slit by an elastic deformation of the cover.

6. The electronic apparatus of claim 1, wherein the slit extends along a direction of an air flow.

7. An electronic apparatus comprising:
    a housing;
    a fan in the housing, the fan comprising a fan case which is a separate body from the housing, the fan case comprising a wall, a discharge port at an end of the wall, and a cutout portion provided in a lower half of the wall and adjacent to the discharge port;
    a heat sink in the housing, the heat sink located outside the fan case and facing downstream of the discharge port;
    a heat pipe comprising a curved portion and one end portion, the curved portion passing through the cutout portion and disposed at a corner portion of the fan case, and the one end portion disposed at a downstream of the discharge port and connected to the heat sink; and
    a bracket attached to a bottom of the heat sink and connected to the discharge port of the fan case, the bracket comprising a stand-up portion configured to support the curved portion and to cover a part of the cutout portion below the heat pipe.

* * * * *